Figure 22:
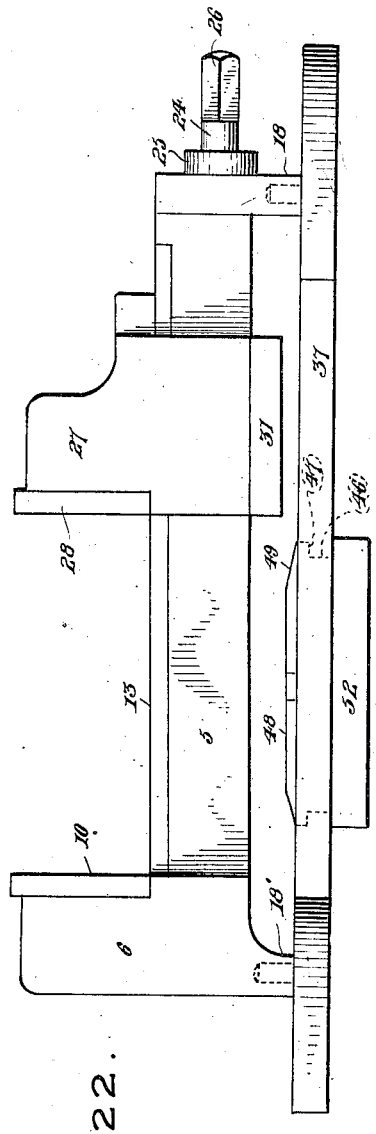

J. K. SKINDER.
VISE.
APPLICATION FILED FEB. 19, 1920.
1,375,236.
Patented Apr. 19, 1921.
6 SHEETS—SHEET 1.
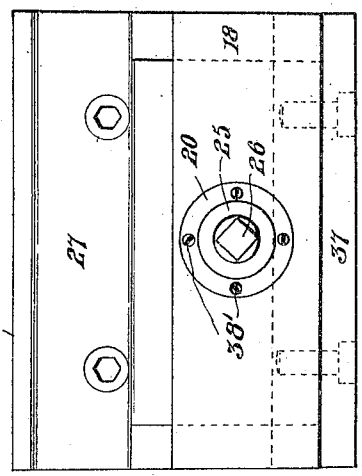
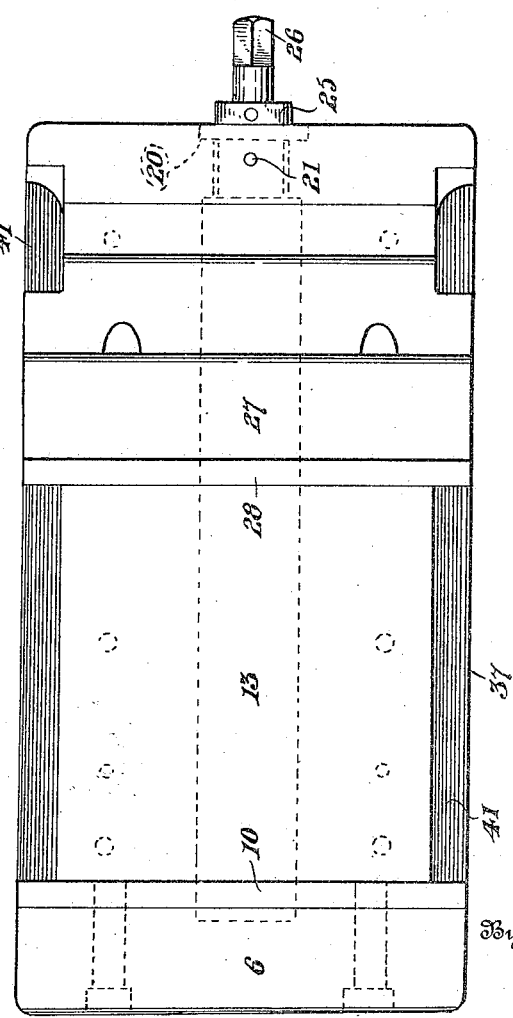
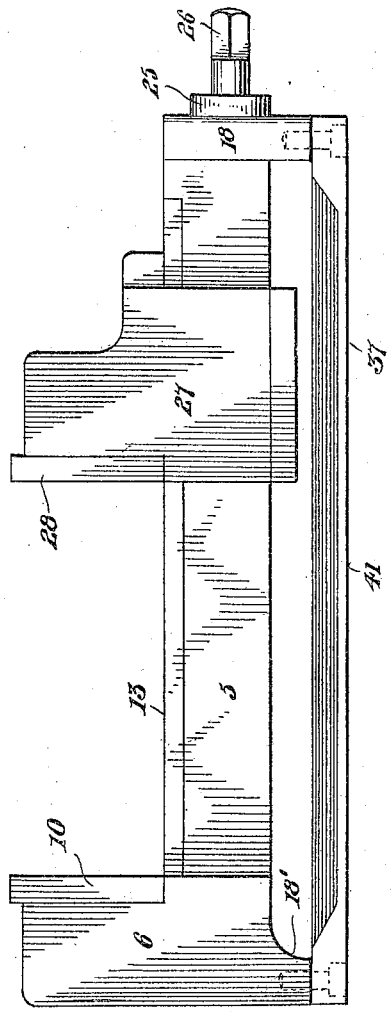
Inventor
J. K. Skinder
By A. M. Wilson
Attorney

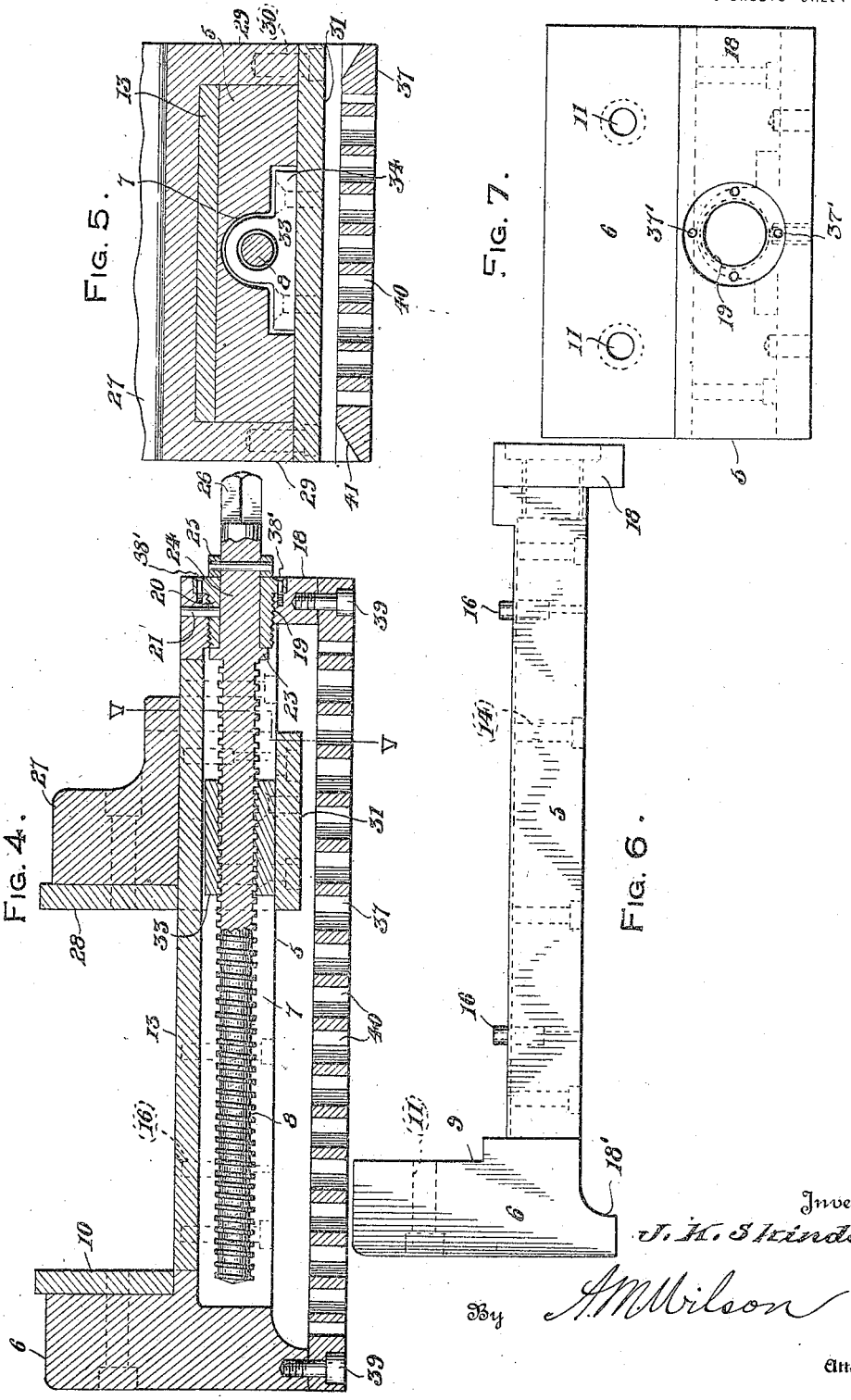

J. K. SKINDER.
VISE.
APPLICATION FILED FEB. 19, 1920.
1,375,236.
Patented Apr. 19, 1921.
6 SHEETS—SHEET 3.
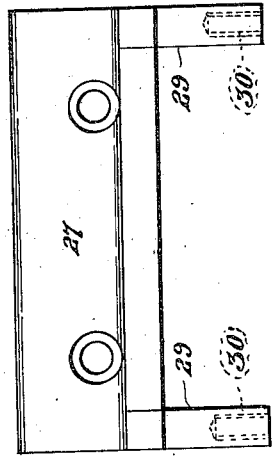
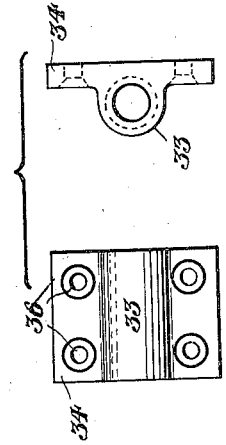
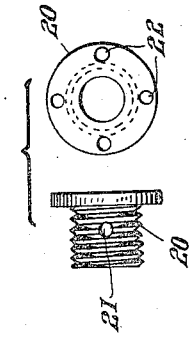
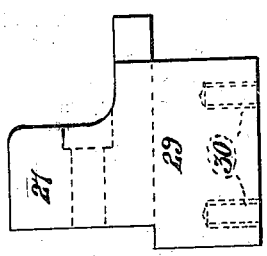
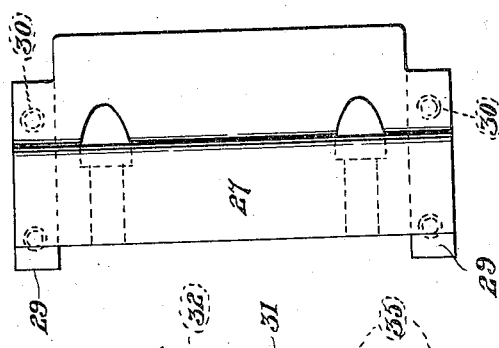
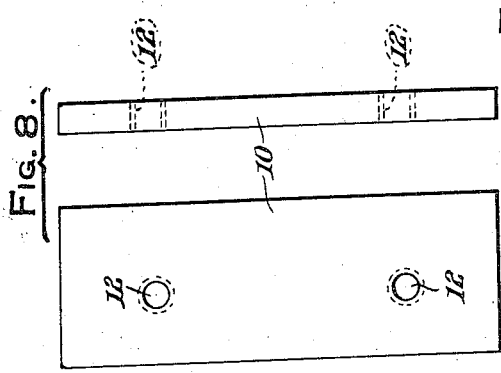
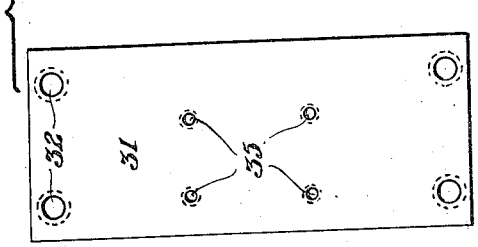
Inventor
J. K. Skinder
By A. M. Wilson
Attorney J. K. SKINDER.
VISE.
APPLICATION FILED FEB. 19, 1920.
1,375,236.
Patented Apr. 19, 1921.
6 SHEETS—SHEET 4.
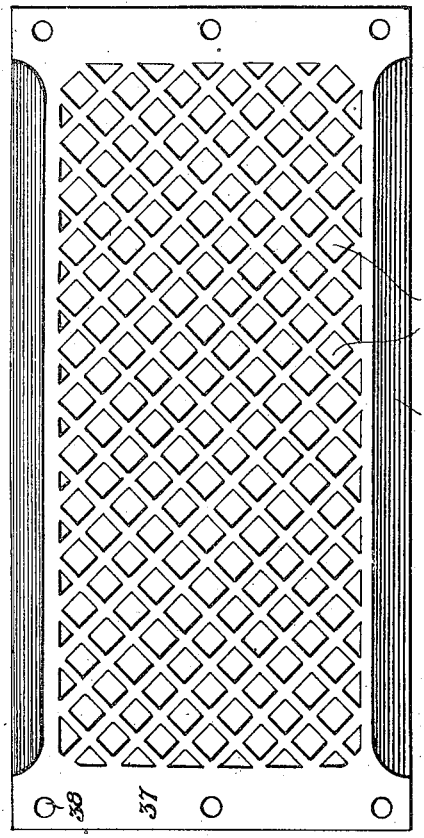
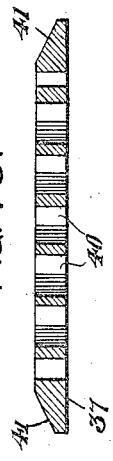
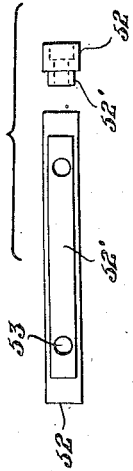
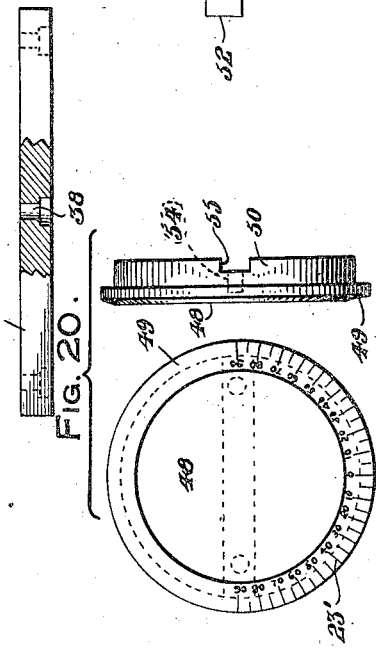
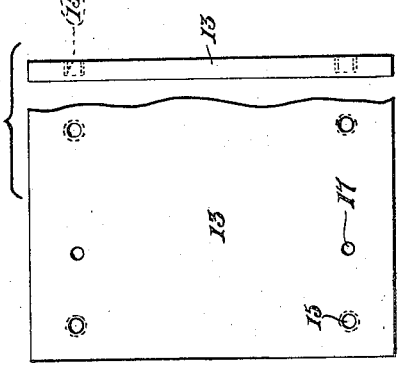
Inventor
J. K. Skinder
By A. M. Wilson
Attorney

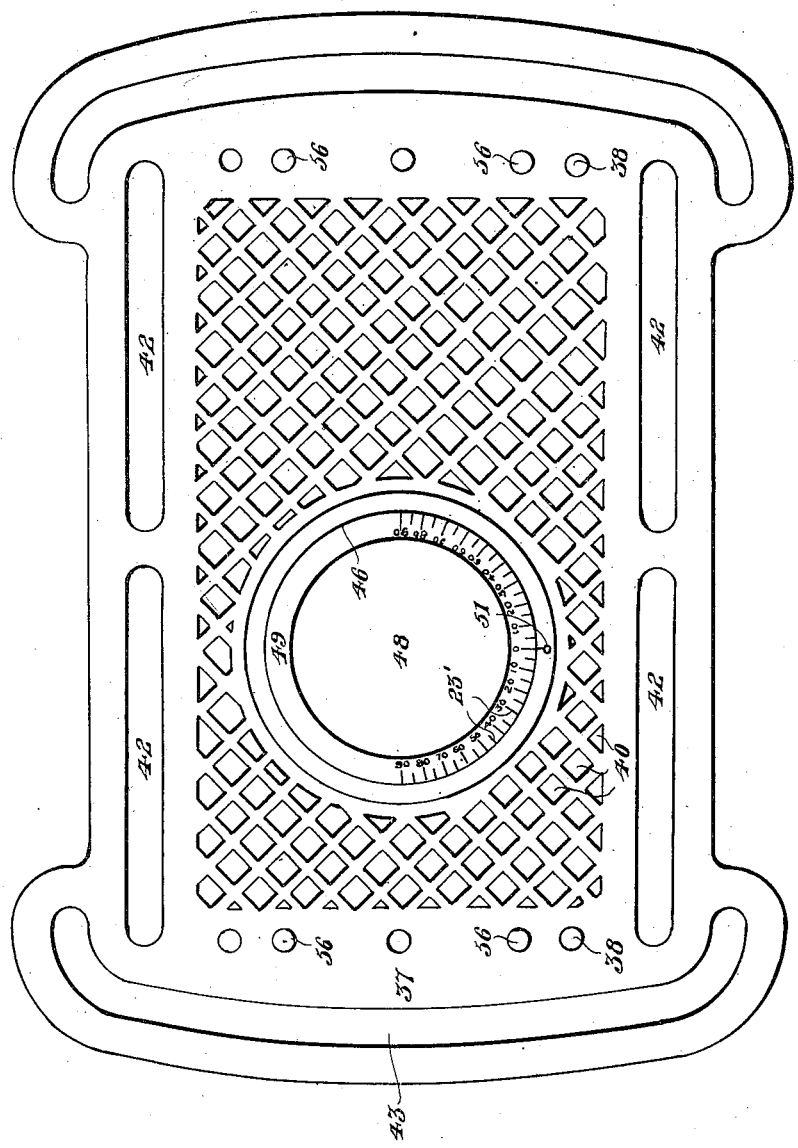

J. K. SKINDER.
VISE.
APPLICATION FILED FEB. 19, 1920.

1,375,236.

Patented Apr. 19, 1921.
6 SHEETS—SHEET 6.

Inventor
J. K. Skinder
By A. M. Wilson
Attorney

UNITED STATES PATENT OFFICE.

JOSEPH K. SKINDER, OF KENOSHA, WISCONSIN.

VISE.

1,375,236.  Specification of Letters Patent.  Patented Apr. 19, 1921.

Application filed February 19, 1920. Serial No. 359,889.

*To all whom it may concern:*

Be it known that I, JOSEPH K. SKINDER, a citizen of Poland, residing at Kenosha, in the county of Kenosha and State of Wisconsin, have invented certain new and useful Improvements in Vises, of which the following is a specification.

This invention relates to certain new and useful improvements in vises especially serviceable for use in clamping work upon the bed of a milling or planing machine or upon a drill press table.

Specifically, the present application is a continuation in part of my application for vises filed July 9, 1919, and bearing Serial No. 309,554.

The primary object of the present invention is to so construct the vise as to effectively shield the feed screw and coöperating parts thereof from contact with particles of material which have heretofore caused considerable delay and imperfect work by clogging the devices so as to prevent ready operation of the feed screw unless the vise were repeatedly cleaned.

Another object of the invention is to provide a vise with a base plate which will insure horizontal position of the vise upon a drill press table even though said table be smaller than the space between the supporting flanges of the vise, and which is so constructed as to enable drillings and filings to be quickly cleaned therefrom.

Another object of the invention is to provide a vise having a base plate so constructed as to be readily fastened at any angle desired upon the bed of a milling or planing machine, whereby the vise is fastened at a corresponding angle thereon.

A still further object of the invention is to provide a vise with a base plate having a protractor attachment arranged to coöperate with the bed of a milling or planing machine for indicating the angle at which the vise is positioned relative to the longitudinal axis of the milling or planing machine bed.

Still another object of the invention is to provide a vise of extremely simple and durable construction whereby the same may be cheaply and easily manufactured and will not readily get out of order.

With the above general objects in view and others that will become apparent as the nature of the invention is better understood, the same consists in the novel form, combination and arrangement of parts hereinafter more fully described in connection with the accompanying drawings.

In the drawings wherein like reference characters designate corresponding parts throughout the several views, Figure 1 is a top plan view of a vise constructed in accordance with the present invention, Fig. 2 is a side elevational view thereof, Fig. 3 is an end elevational view of the same, Fig. 4 is a substantially central longitudinal sectional view of the device shown in Fig. 1, Fig. 5 is a fragmentary transverse sectional view taken substantially upon line V—V of Fig. 4, Fig. 6 is a side elevational view of the vise base and its integral jaw, Fig. 7 is an end elevational view of the device shown in Fig. 6, Fig. 8 illustrates one of the jaw plates in plan and edge views, Fig. 9 illustrates the feed nut carrying plate in plan and edge views, Fig. 10 is a rear elevational view of the movable jaw with the feed nut and its carrying plate removed, Fig. 11 is a side elevational view of the device shown in Fig. 10, Fig. 12 is a top plan view thereof, Fig. 13 illustrates the feed nut in top plan and end views, Fig. 14 illustrates the bearing bushing for the feed screw in elevational and end views, Fig. 15 illustrates a portion of the bed plate of the vise in bottom plan and end views, Fig. 16 is a top plan view of the base plate of the vise shown in Figs. 1, 2 and 4.

Figure 23:
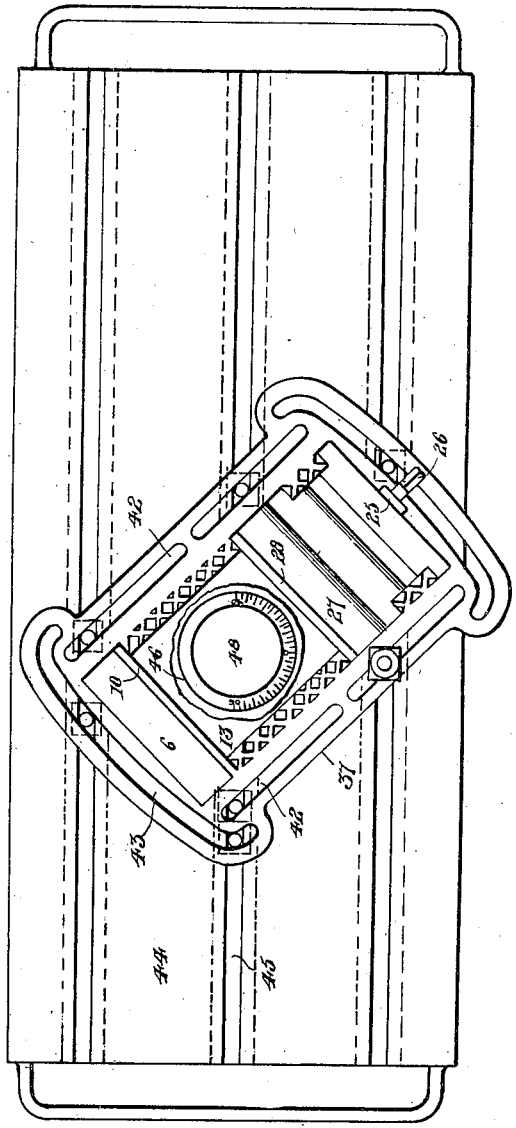

Fig. 17 is an end edge view of the plate shown in Fig. 16, partly broken away,

Fig. 18 is a substantially central transverse sectional view of the plate shown in Fig. 16, Fig. 19 is a top plan view of a modified form of base plate for the vise, Fig. 20 illustrates in plan and edge views the circular indicator member of the protractor which is carried by the base plate of Fig. 19, Fig. 21 illustrates in plan and end views the bar of the protractor which is adapted for engagement in a slot of a milling or planing machine bed for holding the member of Fig. 20 against turning, Fig. 22 is a view similar to Fig. 1 illustrating the vise with the bed plate of Fig. 19 attached thereto for use in connection with milling or planing machines, and Fig. 23 is a top plan view of the device shown in Fig. 22, partly broken away, and shown on a smaller scale angularly disposed upon the bed of a milling or planing machine.

Referring more in detail to the several views, the present invention embodies a horizontal base 5 having a rigid jaw 6 upon one end thereof and provided with a longitudinal groove 7 for the reception of the feed screw 8. The inner face of the jaw 6 is rabbeted as at 9 for reception of the jaw plate 10 which is fastened in position by suitable stud screws passing through the apertures 11 and threaded into the apertures 12 of said jaw plate.

The base 5 is open at its top and has a base plate 13 fastened thereon by means of stud screws which pass through the apertures 14 of the base 5 and are threaded into the apertures 15 of the base plate 13, suitable dowel pins 16 being secured to the base 5 so as to project upwardly therefrom and to enter the apertures 17 of said base plate 13. The end of the base 5 opposite that carrying the jaw 6 is provided with a depending flange 18 having a centrally threaded aperture 19 for reception of the threaded bearing bushing 20, the latter and the flange 18 being apertured as at 21 for permitting oiling of the portion of the feed screw 8 which is journaled in the bearing bushing 20. In order to permit the insertion of the bushing 20, the latter is provided with suitable apertures 22 for engagement by the pins of a spanner wrench or the like.

The feed screw 8 is provided adjacent its outer end with an integral annular flange 23 which bears against the inner end face of the bushing 20 and from which projects the smooth portion 24 of the feed screw which is journaled within the bushing 20. A collar 25 is fastened upon the smooth portion 24 so as to bear against the outer end face of the bushing 20 and prevent inward longitudinal movement of the feed screw, it being noted that the feed screw is prevented from outward longitudinal movement by means of the flange 23. If desired, the outer end of the feed screw 8 may be squared as at 26 for reception of a wrench or any suitable form of handle in order that the feed screw may be rotated when desired.

A movable jaw 27 rests upon the base plate 13 and has a jaw plate 28 secured thereto, said jaw plate 28 being of the same form as the plate 10 and being secured to the jaw 27 in the same manner in which the plate 10 is secured to the jaw 6. The jaw 27 is provided with depending side flanges 29 which engage the side faces of the base 5 and which are provided with threaded sockets 30 extending upwardly from the lower edges thereof.

A feed nut carrying plate 31 is arranged transversely beneath the base 5 and is secured to the flanges 29 of the jaw 27 by means of suitable stud screws which pass through the apertures 32 of the plate 31 and are threaded into the sockets 30 of said flanges 29. A feed nut 33 is arranged within the groove 7 with its base flanges 34 resting upon the plate 31 so that the apertures 35 of the latter coincide with the apertures 36 of said feed nut. The feed nut is secured in this position by suitable stud screws which pass through the apertures 36 and are threaded into the apertures 35.

It is noted that the feed screw 8 is threaded through the nut 33 and is arranged beneath the base plate 13 and between the sides of the base 5 so that any material is prevented from gaining access to the feed screw and its nut, thereby preventing possibility of these parts becoming clogged and accordingly removing any necessity for repeated cleaning of the vise. If desired, the flange 18 may be provided with a plurality of threaded sockets 37' and stud screws 38' may be passed through the apertures 22 of the bushing 20 and be threaded into said sockets 37' in order to effectively secure the bushing against rotation or accidental removal. See Figs. 3, 4, 7 and 14.

As the jaw 27 is slidably mounted upon the base plate 13, and as the nut 33 is rigidly carried by the plate 31, it is obvious that rotation of the worm or feed screw 8 will cause movement of said jaw 27 toward or away from the jaw 6, depending upon the direction of rotation of said feed screw. A flange 18' projects downwardly from the rigid jaw 6 so that its under face is in the same horizontal plane as the under face of the flange 18.

It often happens that a drill press table is considerably smaller in diameter than the space between the flanges 18 and 18' so that the vise cannot be advantageously used thereon. In order to provide a practical means for permitting the use of the vise in this event, I provide a base plate 37 which is provided with end countersunk holes 38 for the reception of suitable stud screws 39 which are adapted to be threaded into threaded sockets provided in the flanges 18 and 18' for rigidly fastening said base plate 37 to the vise proper.

The base plate 37 is substantially rectangular in plan and is perforated substantially throughout its area to permit the passage of filings or drillings therethrough so that said drillings or filings will not accumulate upon the plate 37 sufficiently to impede the movement of the adjustable jaw 27 and its adjusting means. As shown, the perforations 40 of the plate 37 are relatively large so that the filings or drillings may readily pass therethrough. In order to additionally insure the passage of the filings or drillings off of the plate 37, the latter is provided with chamfered or beveled side edges as at 41. It will thus be seen that when the vise is provided with the base plate 37, the same may be placed as desired upon a drill press table and the horizontal position of the vise is insured by a means which does not permit clogging of the movable vise parts.

The base plate 37 may be modified so as to enable the same to be fastened in any angular position desired to the bed of a milling or planing machine. Referring to Figs. 19 to 23 inclusive, this modification is illustrated as including an enlargement of the plate and the provision of suitable elongated straight side slots 42 and curved end slots 43 in the plate. It will be seen that when the base plate 37 is attached to the vise and placed upon the bed 44 of a milling or planing machine, the slots 42 and 43 will coincide with portions of the longitudinal undercut grooves 45 of said bed 44. Headed bolts may be positioned in a well known manner in the slots 45 so that their shanks project upwardly through the slots 42 and 43, whereby, when suitable nuts are threaded upon the shanks of said bolts, the base plate and vise will be rigidly fastened in the desired position.

It is quite desirable to place the vise at various definite angles relative to the longitudinal axis of the bed 44 during the performance of certain work, and in order to provide for this, I have devised a protractor attachment for the base plate 37 which is illustrated in Figs. 19 to 23 inclusive. The base plate 37 is provided with a countersunk circular opening 46 centrally between its side edges so as to provide an annular shoulder 47 as illustrated by dotted lines in Fig. 22. A circular indicator member 48 of a protractor has its top flange 49 disposed within the enlarged portion of the opening 46 so that said flange 49 rests upon the shoulder 47 and the smaller circular portion 50 of the indicator member extends downwardly partially through the smaller portion of the opening 46. As the openings 46 and the member 48 are circular, said member 48 may freely rotate relative to the base plate 37. The bevel edge of the member 48 is provided with the usual graduations 23' which coöperate with the zero mark 51 provided upon the base plate 37 for indicating the angular position at which the vise and the base plate are adjusted relative to the longitudinal axis of the machine bed 44. In order to retain the indicator member 48 within the opening 46 and to hold the same against movement when the vise and base plate are swung relative thereto, I provide a cross bar 52 adapted to be disposed in the central slot 45 of the bed 44 and fastened to the member 48 by means of suitable stud screws which are passed through the apertures 53 of the bar 52 and are threaded into the threaded sockets 54 of the indicator member 48. The member 48 is provided in its under side with a transverse groove 55 within which the upper reduced portion 52' fits.

With the vise fastened to the base plate as shown in Figs. 22 and 23, and the bar 52 disposed in the central slot 45 of the bed 44, the vise and base plate may be turned at any desired angle and there secured. When the vise and base plate are thus turned, the zero mark 51 moves past the graduations 23' of the member 48 because of the fact that said member 48 is held against movement by positioning of the bar 52 in the slot 45, and the operator can readily ascertain when the correct angular adjustment is had, after which the base plate and vise may be securely held in the adjusted position as hereinbefore described.

If desired, the flanges 18 and 18' may be provided with sockets for reception of the pins 56 which are rigid with and project upwardly from the base plate 37 of Fig. 19 at the ends of the latter. By the use of the pins 56, the vise may be quickly positioned upon the base plate 37 prior to the securing of the plate 37 to the vise proper by means of the stud screws 39 hereinbefore mentioned as passing through the apertures 38.

From the foregoing description, it is believed that the construction and operation as well as the advantages of the present invention will be readily understood and appreciated by those skilled in the art.

While the preferred embodiments of the invention are herein shown and described, it is nevertheless to be understood that minor changes may be made therein without departing from the spirit and scope of the invention as claimed.

What I claim as new is:—

1. A vise comprising a base having a jaw rigid on one end thereof and provided with a longitudinal groove in its under side, a depending flange rigid upon the other end of said base and provided with a central aperture, a bushing secured within said aperture, a feed screw journaled in said bushing and extending toward said jaw within the longitudinal groove of the base, a movable jaw slidably mounted upon said base and provided with depending flanges engaging the opposite sides of said base, a transverse plate secured to said flanges and arranged beneath said base, and a feed nut rigidly secured upon the upper face of said plate within the longitudinal groove of the base and through which said feed screw is threaded.

2. A vise comprising a base having a jaw rigid on one end thereof and provided with a longitudinal groove in its under side, a depending flange rigid upon the other end of said base and provided with a central aperture, a bushing secured within said aperture, a feed screw journaled in said bushing and extending toward said jaw within the longitudinal groove of the base, a movable jaw slidably mounted upon said base and provided with depending flanges engaging the opposite sides of said base, a transverse plate secured to said flanges and arranged beneath said base, a feed nut rigidly secured upon the upper face of said plate within the longitudinal groove of the base and through which said feed screw is threaded, said base having an open top, and a base plate secured upon said base to close the open top thereof and arranged above the feed screw.

3. A vise comprising a base member having a jaw rigid on one end thereof and having a depending flange at the opposite end provided with an aperture therethrough, said base having a longitudinal groove in the under face thereof coincident with said aperture, a feed screw journaled in said aperture and extending in said groove, a movable jaw slidably mounted upon said base and provided with depending flanges engaging the opposite sides of the base, a plate disposed transversely beneath said base and fastened to said flanges of the movable jaw, and a feed nut engaging said feed screw and rigidly carried by said plate.

4. A vise comprising a base having a rigid jaw on one end thereof and provided with a longitudinal groove in the under face thereof, a depending apertured flange at the opposite end of the base, a feed screw arranged within said groove and journaled in the aperture of said flange, a jaw slidably mounted upon said base, a plate arranged beneath said base and rigidly connected to said jaw, and a feed nut rigidly carried by said plate within said groove and having said feed screw threaded therethrough.

5. The combination with a vise including a base having a rigid jaw at one end and a depending transverse flange at the other end, said jaw having a depending transverse flange, of a base plate secured at its opposite ends to the under faces of said flanges and perforated substantially throughout its area, the perforations of said base plate being of such size as to insure passage of drillings or filings therethrough.

6. The combination with a vise including a base having a rigid jaw at one end and a depending transverse flange at the other end, said jaw having a depending transverse flange, of a base plate secured at its opposite ends to the under faces of said flanges and perforated substantially throughout its area, the perforations of said base plate being of such size as to insure passage of drillings or filings therethrough, said base plate having chamfered sides.

7. The combination with a vise including a base having a rigid jaw at one end and a depending transverse flange at the other end, said jaw having a depending transverse flange, of a base plate secured at its opposite ends to the under faces of said flanges and provided with longitudinal slots at its opposite edges and curved slots at its ends for permitting bolting of the vise and base plate rigidly to a planing or milling machine bed at any angle desired.

8. The combination with a vise including a base having a rigid jaw at one end and a depending transverse flange at the other end, said jaw having a depending transverse flange, of a base plate secured at its opposite ends to the under faces of said flanges and provided with longitudinal slots at its opposite edges and curved slots at its ends for permitting bolting of the vise and base plate rigidly to a planing or milling machine bed at any angle desired, said base plate having a bevel protractor rotatably disposed therein including a bar adapted for reception within the groove of a milling or planing machine bed to hold the indicator member of the protractor against movement when the base plate and vise are swung relative thereto.

9. The combination with a vise including a base having a rigid jaw at one end and a depending transverse flange at the other end, said jaw having a depending transverse flange, of a base plate secured at its opposite end to the under faces of said flanges and provided with longitudinal slots at its opposite edges and curved slots at its ends for permitting bolting of the vise and base plate rigidly to a planing or milling machine bed at any angle desired, said base plate having a bevel protractor rotatably disposed therein including a bar adapted for reception within the groove of a milling or planing machine bed to hold the indicator member of the protractor against movement when the base plate and vise are swung relative thereto, said bar constituting means for securing the indicator member of the protractor to the base plate.

In testimony whereof I affix my signature.

JOSEPH K. SKINDER.